G. G. CARD.
TIRE TUBE.
APPLICATION FILED MAR. 30, 1918.
1,374,634.
Patented Apr. 12, 1921.
3 SHEETS—SHEET 1.
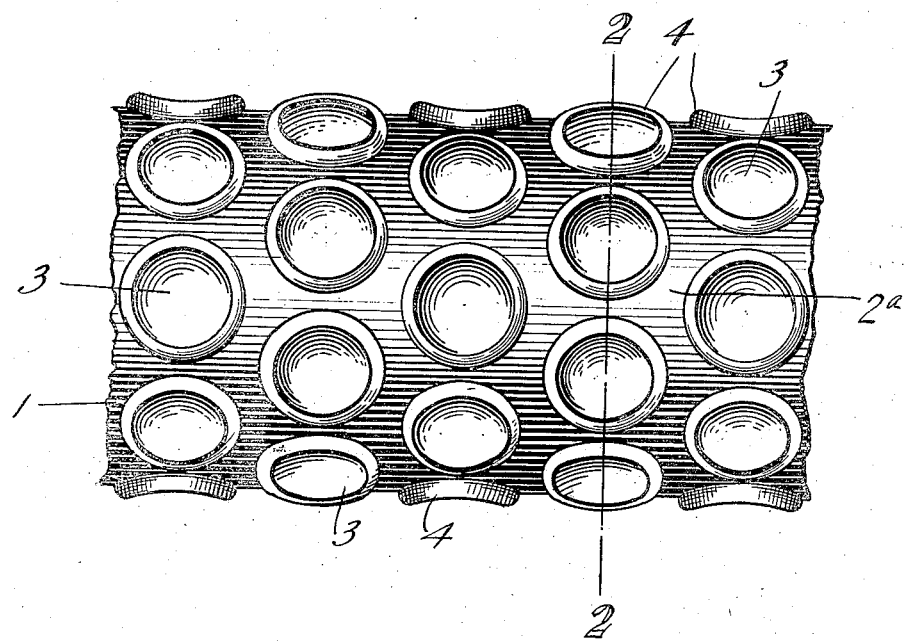
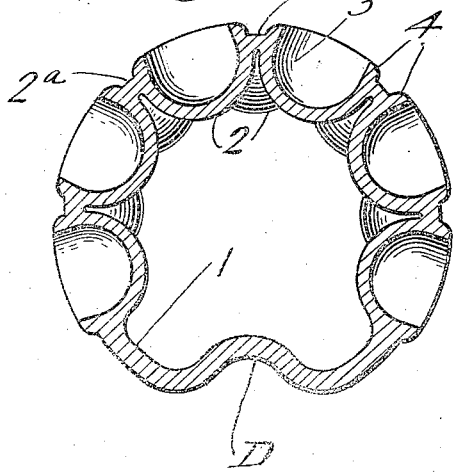
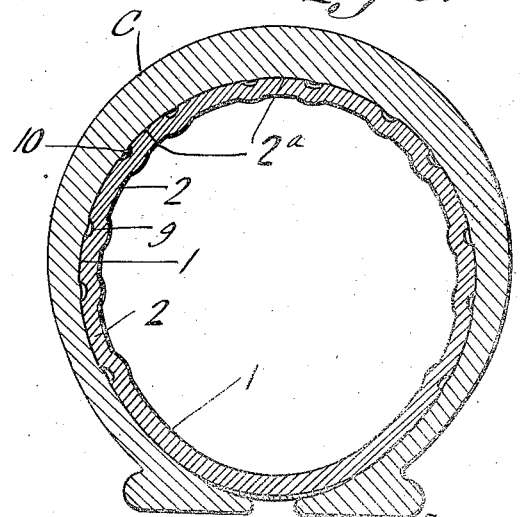

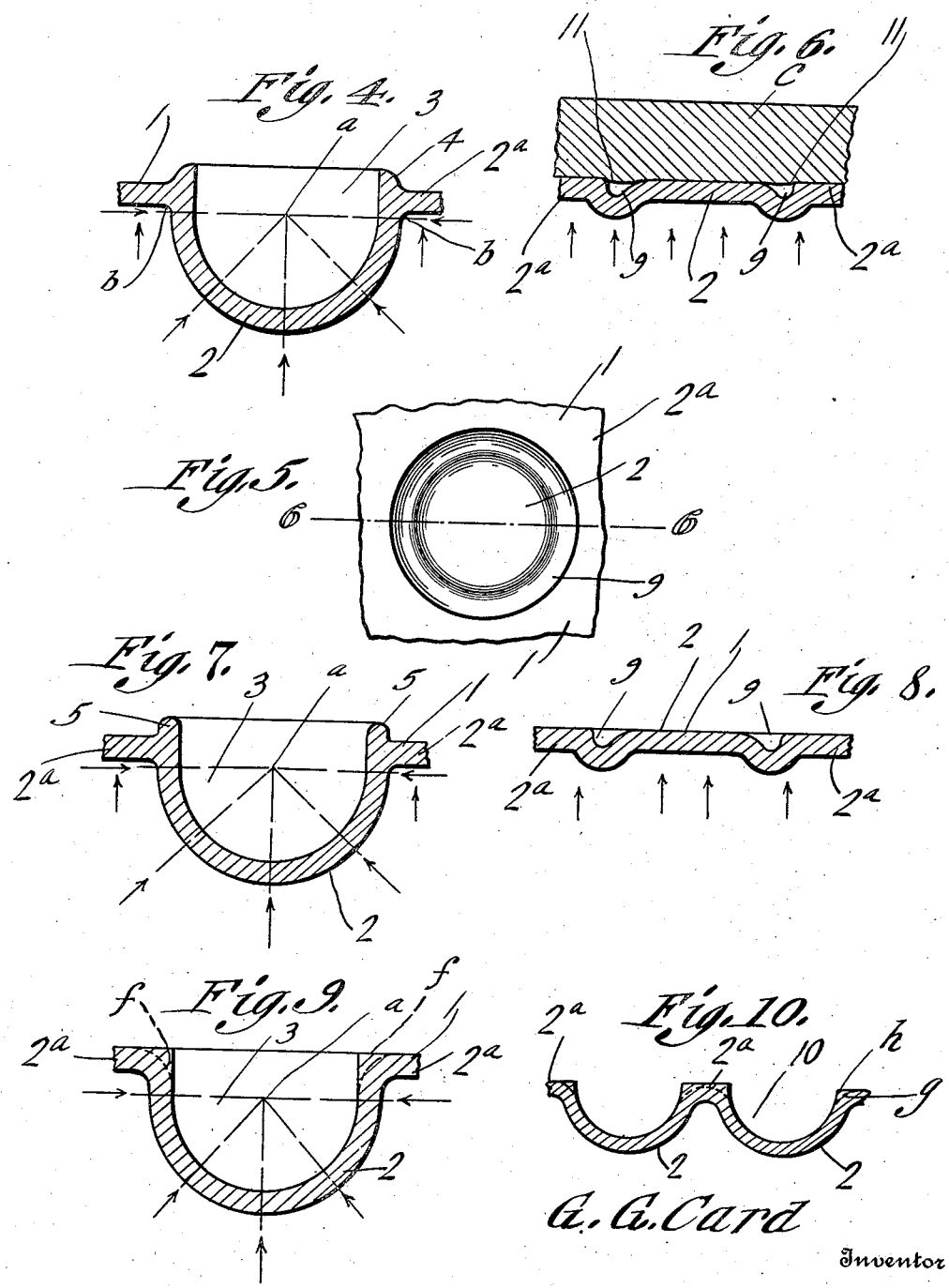

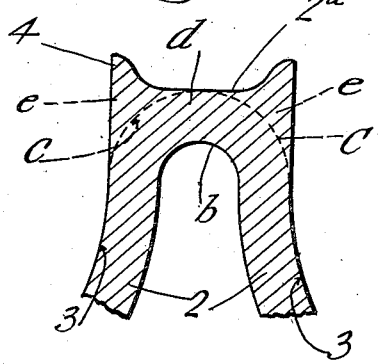
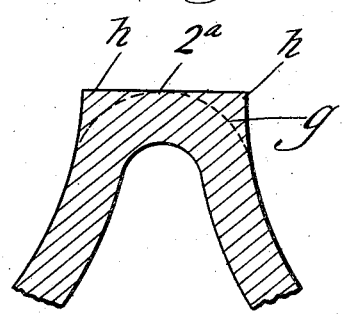
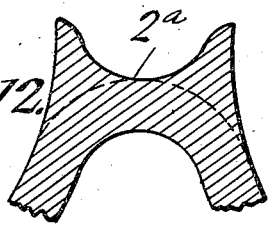
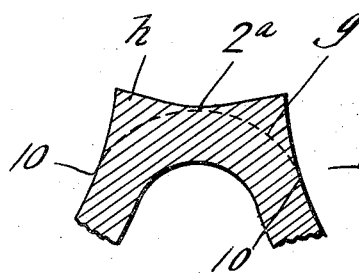
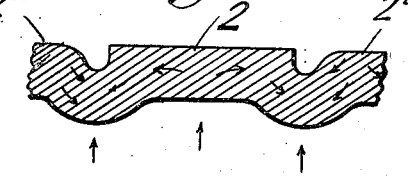
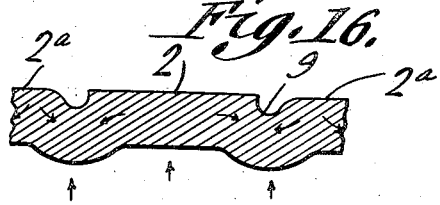

UNITED STATES PATENT OFFICE.

GEORGE G. CARD, OF COLUMBUS, OHIO, ASSIGNOR TO THE COLUMBUS CLIMAX RUBBER COMPANY, OF COLUMBUS, OHIO.

TIRE-TUBE.

1,374,634.  Specification of Letters Patent.  Patented Apr. 12, 1921.

Application filed March 30, 1918. Serial No. 225,812.

*To all whom it may concern:*

Be it known that I, GEORGE G. CARD, a citizen of the United States, residing at Columbus, in the county of Franklin and State of Ohio, have invented a new and useful Tire-Tube, of which the following is a specification.

This invention relates to inner tubes for pneumatic tires of the self sealing type wherein inwardly extended nodes are utilized for providing a surplus of material for densification in the tread portion of the tube when the tube is expanded under air pressure against the casing or carcass of the tire.

It is an object of the present invention to provide a tube which is not only self sealing, but which will also be held against creeping within the casing, a plurality of vacuum chambers of minute size being produced between the tube and the casing when the tube is inflated so as to insure a tight grip by the tube upon the casing, the size of the vacuum chambers and the tenacity of the grip upon the casing increasing in proportion to the relative flexion of the tube and casing.

Another object is to provide an inner tube which, when inflated, will not only be compressed against the casing but will also be formed with non-communicating vacuum chambers which, as pressure may be reduced within the tube, will gradually enlarge increasing the tenacity of the grip by the tube upon the casing.

A still further object is to provide a tube having inwardly extended nodes which are hollow, a surplus of material being provided around the open ends of the respective nodes, for insuring a sealing connection between the tube and its casing and the creation of non-communicating vacuum chambers, said surplus of material, during inflation, being distributed to densify the tube at the points where the most abrupt bends of the tube occur, and in the webs connecting the nodes.

With the foregoing and other objects in view which will appear as the description proceeds, the invention consists of certain novel details of construction and combinations of parts which will be hereinafter more fully described and pointed out in the claims, it being understood that various changes may be made in the arrangement and proportions of the parts without departing from the spirit or sacrificing any of the advantages of the invention as set forth in the appended claims.

In the accompanying drawings the preferred forms of the invention have been shown.

In said drawings—

Figure 1 is a plan view of a portion of an inner tube having the present improvements.

Fig. 2 is a section on line 2—2, Fig. 1.

Fig. 3 is a similar section showing the tube under pressure within a casing.

Fig. 4 is an enlarged section through one of the nodes of the inner tube.

Fig. 5 is a plan view thereof, when compressed.

Fig. 6 is a section through the node when placed under compression within a casing, said section being taken on the line 6—6, Fig. 5.

Fig. 7 is an enlarged section through a modified structure.

Fig. 8 is a section therethrough, the node being compressed.

Fig. 9 is a view similar to Fig. 7 and showing another form of the device.

Fig. 10 is a section showing a modified form of node.

Figs. 11, 12 and 13 are sectional views showing developments of the densifying action of the node shown in Fig. 4, when placed under compression.

Figs. 14, 15 and 16 are similar views showing the development of the densifying action of the node shown in Fig. 10, when placed under compression.

Fig. 17 is a section through another form of node.

Referring to the figures by characters of reference, 1 designates the tube which is of soft rubber of any suitable thickness and is designed to fit snugly within its casing C. There are molded in the sides and tread portion of the tube cup shaped depressions or recesses forming interior nodes 2 which are preferably staggered as shown. The walls of the nodes are of uniform thickness and of the same thickness as the web portions 2ª of the tube between the nodes. To provide a surplus of material in the wall of the tube for the purpose of increasing the density of the wall when placed under compression, as hereinafter described, an annular depression D is formed in the inner periphery of the tube. At this point it might be stated that the primary or most essential object to be attained in order to render the present invention practical for the purposes intended, is the provision of a surplus of material around the open end of each node so that, when the tube is compressed against the casing, three highly important results are secured. First, the surplus of material will form a sealing engagement with the casing in which the tube is located, thereby to form separate noncommunicating compartments or chambers between the tube and casing; second, it will, when compressed, and while in sealing contact with the casing, pack or densify the adjacent portion of the tube, thereby to render the wall of the tube so stiff as to insure the formation of an annular chamber in the open end of the node when the node is compressed; and third, it will be distributed into the web portion $2^a$ of the tube, or, in other words, into that portion between the nodes, thereby to increase the density of said web portion and permit the nodes to be located farther apart than would otherwise be possible and without impairing the efficiency of the tube.

The provision of surplus material around each node can be effected in several ways. For example, and as shown in Fig. 4 the inner surface of each node, or, in other words, the wall of the depression 3 within each node may be cylindrical at the open end of the node or depression, this cylindrical portion extending inwardly past the inner surface of the wall of the tube 1 and terminating in line with a point $a$ which is concentric with the semi-spherical inner portion of the node 2. As the inner surface of the web $2^a$ between the nodes is rounded or concave, as shown at $b$ in Fig. 11, it will be apparent that an imaginary surface $c$ parallel therewith and forming a continuation of the surfaces of the depressions 3 would divide the web into a wall $d$, of the same thickness as the walls of the nodes, leaving a surplus $e$ of material around the open end of each node as shown. This surplus can be increased by forming a bead around the outer or open end of each node.

The inner wall of the bead can be flush with and constitute a continuation of the cylindrical portion of the wall of the depression 3 while the outer wall of the bead is rounded or tapered outwardly as shown in Fig. 4. In the form of device shown in Fig. 7 the bead 5 can be rounded instead of coming to an edge as in Fig. 4.

In using the inner tube shown in Figs. 4 and 7 it is placed in a collapsed condition, within the casing C. Air is then forced thereinto as ordinarily and, as the tube is thus expanded within the casing the ribs or beads 4 or 5 will be pressed against the inner surface of the casing C and gradually be flattened thereagainst. In Figs. 11, 12 and 13 the densifying action has been illustrated clearly. Fig. 11 shows the relative positions of the portions prior to inflation. Should the tube be partly inflated the marginal portion of the open end of each node would bend outwardly, if unrestrained, as shown in Fig. 12. However, as a casing is fitted snugly on the tube this outward bending is prevented. Instead, when the tube is fully inflated the edge of each rib will form a tight or sealing contact with the inner surface of the casing, and the surplus material of the rib and the portion $e$ will pack into and stiffen or densify the wall of the open end of the node and those portions of the webs $2^a$ adjacent thereto. At the same time the air within the tube will exert pressure along radial lines against each node 2, gradually flattening out the node by densifying the material forming the wall thereof. The wall of the node will thus be contracted and pressed outwardly into the cylindrical portion of the depression 3, producing a circular fold or trough 9 just within the densified or stiffened marginal portion of the compressed node and between the tube and the casing C. The slight stretching of the material of the tube at the point $b$ due to the folding or outward bending of the marginal portion of the node does not reduce the thickness or otherwise weaken the tube because the surplus material hereinbefore referred to is pressed into the wall of the tube at these points, thus offsetting any weakness which might otherwise occur. Obviously, during the flattening of the nodes, the air contained within their depressions 3 will be dissipated, leaving shallow troughs 9 and the material constituting the wall of the tube will be densified by the compression and packing against the casing C of the material contained in the walls of the nodes and within the walls of the channel or depression D. Thus, in the event of a puncture, the walls of the opening produced in the tube 1 will be pressed tightly together and the tube will seal automatically.

While the recesses in the nodes are made cylindrical at their open ends under some conditions, said recesses can, under other conditions be made semi-spherical as shown at 10 in Fig. 17, the surplus material outside of the imaginary surfaces indicated by dotted lines at $f$ in said figure being designed to pack into the wall of the tube to densify that portion surrounding and between the nodes.

Furthermore, if desired, the ribs or beads can be dispensed with, whether the recesses in the nodes have cylindrical open end portions, as in Fig. 9, or are semi-spherical, as in Fig. 10. A tube having nodes as shown in Fig. 10 will be efficient if the nodes are sufficiently close to enable the webs 2ª to be properly densified by the surplus material outside of the surfaces indicated by dotted lines at $g$. Figs. 14, 15 and 16 show clearly how with the form shown, for example, in Fig. 10, proper densifying of the wall of the tube will occur when the tube is inflated. The line $g$ indicates an imaginary surface concentric with the inner rounded surface of the web 2ª between the nodes. Surplus material has been indicated at $h$. As shown in Fig. 15, the tendency of the surplus material is to press outwardly to present the margin of the open end of the depression 10 to the inner surface of the casing of the tire, thereby to insure a sealing contact. When the tube is fully expanded, however, this surplus material $h$ will be pressed into the wall of the tube and around the node, densifying the wall and insuring the formation of the annular trough 9 when the node is fully densified or compressed within itself, as in Fig. 16. The amount of surplus material for packing the wall of the tube is, of course, not so great in the structure shown in Fig. 10 as in the form shown in Fig. 9.

It will be noted that in all forms of the device the nodes are separated by webs 2ª which provide substantially flat bearing surfaces for engaging the tire casing when the tube is expanded and, in every instance, these webs will be densified by the surplus material surrounding the open ends of the nodes and by part of the densified material of the nodes.

Aside from its efficiency as a self sealing tube, the device is especially useful because it prevents positively all creeping of the tube in the casing. Owing to the constant depression or kneading action of the tire, particularly while traveling at a high speed, or over ruts or other irregular surfaces, a movement of the tube relative to the casing often takes place with the result that disastrous blow-outs occur at times. By utilizing the tube herein described, the air initially contained within the depressions 3 is dissipated when the tube is expanded, leaving a small circular trough at the margin of each flattened node. Some of the surplus material surrounding the open ends of the nodes will press into the inner surface of the casing C (which surface is usually of a fabric) and completely close communication between the various troughs or depressions 9. Furthermore those portions of the casing directly opposite the troughs 9 will bulge slightly into the troughs as at 11, so that inter-fitting connections are thus produced between the casing and the tube. Owing to the kneading action of the tire while in use after inflation, the small amount of air contained within the troughs 9 will be worked out leaving circular vacuum chambers in the troughs 9 which cause the tube 1 to cling to the casing under all conditions. Should the air pressure within the tube become reduced, thus moderating the compression of the tube upon the casing, the nodes, by reason of the elasticity of the material of which they are made, will tend to reassume their normal form, thereby creating vacuum chambers of increased size and setting up a grip upon the casing of increased tenacity. As the various vacuum chambers are sealed by the bead contacts with the casing, each chamber acts independently of the others and the destruction of the vacuum at one or more points will have no effect upon the gripping action at other places in the casing. As has heretofore been indicated by providing faces between the open ends of the nodes which follow the transverse and longitudinal curvature of the inner surface of the tire casing, when the tube is placed in the tire casing these portions of the outer surface of the tube will present extensive gripping surfaces for engaging the tire casing. Furthermore, as heretofore indicated, the nodes are so located relative to each other and are so proportioned that when they are pressed outwardly against the inner surface of the tire casing by the direction of air under pressure into the tube, the material forming the walls of the nodes will be ample to cause compression both of the walls of the nodes and of those portions of the wall of the tube between the nodes, this compression being uniform throughout the area of the tube.

What is claimed is:—

1. An inner tube for pneumatic tires having inwardly extending hollow nodes, and a thickness of material surrounding the open end of each node, adapted under air compression to pack and densify the wall of said open end and form an endless sealing contact with the inner surface of a casing housing the tube, said nodes being collapsible within their open ends to flatten against said casing and form non-communicating vacuum troughs.

2. An inner tube for pneumatic tires, having inwardly extending hollow nodes, each node being compressible outwardly within the open end portion thereof and against the casing of the tire, during the inflation of the tube, to form a vacuum trough within itself and between the tube and the casing.

3. An inner tube for pneumatic tires, having inwardly extending hollow nodes, and an outstanding bead surrounding the outer end of the depression in each node, said tube being inflatable within a tire casing to compress the beads against the casing and to compress and flatten the nodes within the open ends of their depression and against the casing to form vacuum troughs between the tube and casing at the margins of the flattened nodes.

4. An inner tube of soft rubber having normally inwardly projecting hollow nodes upon its tread portion and a wall portion intermediate the nodes, the outer surface of which follows the normal longitudinal and transverse curvature of the inner surface of a tire casing, the nodes being so proportioned and situated that, when the tube is filled with air under pressure some of the material of the nodes will be distributed into those portions of the wall of the tube between the nodes, thereby to produce substantially uniform compression of the wall of the tube throughout the extent thereof.

5. The combination with a tire casing, of an inner tube having hollow nodes normally extended inwardly, and outstanding beads upon the tube and extending along the margins of the open ends of the respective nodes, said tube being inflatable to compress the beads against the casing and form seals between the spaces inclosed by the beads and to densify the material of the tube at the margins of the nodes, the nodes, during such inflation, being flattened and compressed against the casing and within the open ends of the nodes to form vacuum troughs in the tube at the margins of the flattened nodes and between the tube and casing.

In testimony that I claim the foregoing as my own, I have hereto affixed my signature.

GEORGE G. CARD.